United States Patent [19]

Ishii

[11] E Patent Number: Re. 33,329

[45] Reissued Date of Patent: Sep. 11, 1990

[54] AUTOMATIC FEEDING DEVICE FOR COPYING MACHINES

[75] Inventor: Shoichi Ishii, Kanagawa, Japan

[73] Assignee: Fuji Xerox Co., Ltd., Tokyo, Japan

[21] Appl. No.: 525,775

[22] Filed: Feb. 21, 1984

Related U.S. Patent Documents

Reissue of:

[64] Patent No.: 4,334,674
Issued: Jun. 15, 1982
Appl. No.: 181,557
Filed: Aug. 27, 1980

[30] Foreign Application Priority Data

Sep. 11, 1979 [JP] Japan ..... 54-115721

[51] Int. Cl.[5] ..... B65H 9/04

[52] U.S. Cl. ..... 271/245

[58] Field of Search ..... 271/245, 246, 247, 273, 271/274

[56] References Cited

U.S. PATENT DOCUMENTS

| | | | |
|---|---|---|---|
| 3,186,325 | 6/1965 | DeBelder | 271/246 X |
| 3,388,582 | 6/1968 | Wesstrom . | |
| 3,844,552 | 10/1974 | Bleau | 271/246 X |
| 3,888,582 | 6/1975 | Griswold . | |
| 3,910,570 | 10/1975 | Bleau | 271/245 |
| 4,132,401 | 1/1979 | Gauronski | 271/245 |
| 4,143,960 | 3/1979 | Tracy . | |
| 4,208,233 | 6/1980 | Iwanaga | 271/245 X |
| 4,213,603 | 7/1980 | Peffer | 271/229 |
| 4,214,832 | 7/1980 | Kono . | |
| 4,243,316 | 1/1981 | Gustafson | 271/3 X |
| 4,256,298 | 3/1981 | Ahern | 271/245 |
| 4,281,919 | 4/1981 | Nomura | 271/6 X |

*Primary Examiner*—Richard A. Schacher
*Attorney, Agent, or Firm*—Sughrue, Mion, Zinn, Macpeak & Seas

[57] ABSTRACT

A registration device for use in an automatic feeding device for copying machines in which a magnetic registration member is provided adjacent the forward edge of a platen and an electromagnet is disposed parallel to the registration member in a cover. When no current is applied to the electromagnet, the registration member is in an upper position acting as a stop for original documents to be copied. When the electromagnet is activated, the registration member is urged downwardly against the force of a spring by opposing magnetic field to a position below the surface of the platen so that original documents can be extracted therefrom. If desired, the edge of the platen and the registration member can be made sloped.

14 Claims, 1 Drawing Sheet

AUTOMATIC FEEDING DEVICE FOR COPYING MACHINES

Matter enclosed in heavy brackets [ ] appears in the original patent but forms no part of this reissue specification; matter printed in italics indicates the additions made by reissue.

BACKGROUND OF THE INVENTION

The present invention relates to a device for operating a registration member in an automatic feeding device for original documents utilized in a copying machine.

In an automatic feeding device for original documents in a copying machine, it has been general practice to carry out the registration of original documents by abutting the tip end of the original document against a registration member. When the original document is no longer needed for copying, it is necessary that the registration member be moved such as by retracting it to a standby position which is at a position lower than the surface of the original document and at which the tip end of the original document will not strike thereagainst. To implement this, the prior art technique was to transfer a member directly coupled to the registration member to a standby position with a reciprocating device such as a solenoid. For this reason, space was required for the reciprocating device thereby greatly restricting the overall available space while the mechanism needed was complex and costly.

Also, a large length was required for the registration member so that all the edge surface of the original document in the widthwise direction would properly abut the registration member. This is a great disadvantage both in spacial and constructional requirements.

Consequently, it is an object of the invention to provide an operating device for a registration member in an automatic feeding device for original documents which requires only a narrow space and which can transfer documents uniformly and smoothly over all the lengthwise direction thereof.

SUMMARY OF THE INVENTION

This, as well as other objects of the invention, are met by a registration device for an automatic feeding device for original documents in a copying machine in which a magnetic registration member is disposed adjacent an edge of a platen member. In a copying position upon the upper surface of the platen, the leading edge of an original document to be copied is in abutment with an upper stepped portion of the registration member. The registration member is formed with a permanent magnet extending longitudinally thereof. The registration member is movable between upper and lower positions defined by an adjacent guide means. In the upper position, the upper stepped portion of the registration member extends above the upper surface of the platen while in the lower position, the registration member is entirely below the upper surface of the platen. Spring means urges the registration member upwardly to the copying position. An electromagnet means is located in an adjacent cover. The electromagnet means extends longitudinally preferably by the same length as the registration member. When exited, the electromagnet means produces a magnetic field which urges the registration member to the lower position below the surface of the platen so that original documents can be extracted therefrom. Preferably, the edge of the platen and hence the registration member and guide means are sloped so that light from the copying system can reach the entire surface of the original document.

DESCRIPTION OF THE PREFERRED EMBODIMENTS

Figure 1:
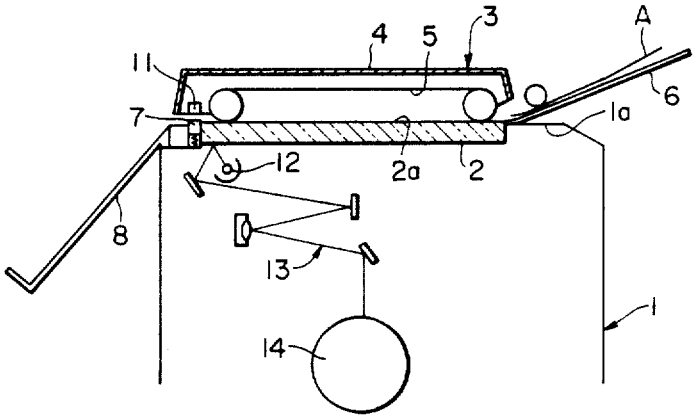
FIG. 1 is a general schematic view showing a copying machine constructed in accordance with the present invention.

Preferred embodiments of the present invention will be described referring to the drawings.

FIG. 1 is a general diagrammatic cross-sectional view of a copying machine of the invention in which a platen 2 is provided on the upper portion 1a of the copying machine body 1 and an automatic feeding device 3 for original documents is mounted above the platen 2.

The automatic feeding device 3 includes a feeding belt 5 for the original documents provided at a position in contact with the upper surface (also, the running surface of the original document) 2a of the platen 2. The feeding belt 5 is disposed within a platen cover 4 opening downwardly. The feeding belt 5 operates to transfer an original document A inserted through a take-in guide 6 along the upper surface 2a of the platen. The copying position of the original document A is determined by a registration member 7 against which the feeding edge of the document abuts. After the completion of the copying operation, the registration member 7 is moved to a standby position and the original document A is delivered to a holding tray 8.

The registration member 7 is made of a permanent magnet having an elongated shape with an upper stepped portion 7a and is freely movable in the vertical direction between one end surface 2b of the platen 2 and the upper end of a guide 9 attached to the upper portion of the copying machine body 1a. The registration member 7 is urged toward the copying position with the upper stepped portion 7a in contact with a lower stepped portion 9a of the guide 9 by a spring 10. In this position, the upper surface 7b of the registration member 7 projects slightly upward beyond the upper surface 2a of the platen 2.

An electromagnet 11 is mounted on the platen cover 4 facing the upper surface 7b of the registration member 7. The electromagnet 11 is energized by a signal indicative of the delivery of an original document. The magnetic field produced by the electromagnet 11 has the same polarity as that of the registration member 7. In FIG. 1, reference numeral 12 designates a lamp, 13 a reflecting optical system, and 14 a photosensitive drum.

Figure 2:
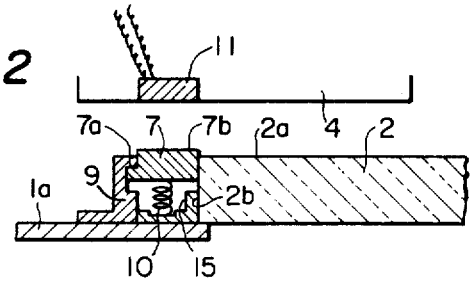
FIG. 2 is an enlarged cross-sectional view of portions of FIG. 1.
Figure 3:
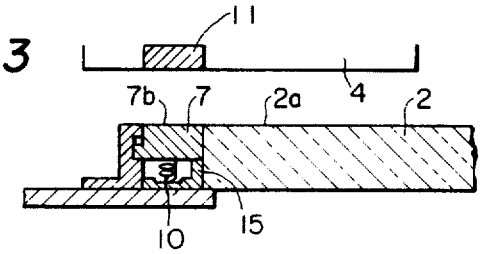
FIG. 3 is a cross-sectional view similar to FIG. 2 showing a lowered portion of a registration member.

When the electromagnet is deenergized, the registration member 7 is moved to the copying position by the spring 10 as shown in FIG. 2 in which the leading edge of the original document A transferred by the original document feeding belt 5 abuts the upper surface of the registration member 7 with positioning thereby effected. When the electromagnet 11 is energized by a signal indicative of the delivery of the original document, a repulsive force is produced between the electromagnet 11 and the registration member 7 whereby the registration member 7 is retracted downwardly against the force of the spring 10 to a standby position in abutment with a stop 15. In the standby position, the upper surface 7b of the registration member 7 is situated below the upper surface 2a of the platen so that it will not obstruct the transfer of the original document A.

As described above, since the registration member 7 is moved to the standby position by utilizing the repulsive force of the magnet, there is no need of providing a reciprocating device such as solenoid and only an electromagnet 11 need be provided on the platen cover 4 whereby the construction of the feeding device is made simpler and the number of parts required is also decreased. Thus, the registration member 4 is constructed utilizing only a narrow space effectively.

Also, since the repulsive force of the magnet is uniform in the longitudinal direction, a uniform pushing force is effected so that the registration member 7 is positioned uniformly without being tilting with respect to the longitudinal direction with only a small amount of transfer movement. With this construction, the original document will not be damaged because of the fact that the leading edge of the original is engaged with the registration member 7 when it is delivered.

Figure 4:
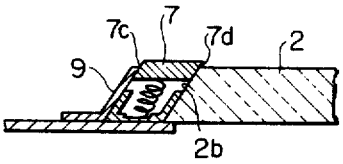
FIG. 4 is a cross-sectional view of another embodiment of an automatic feeding device of the invention.
Figure 5:
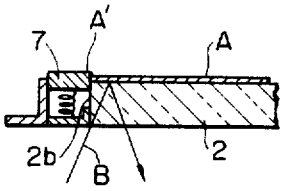
FIG. 5 is a cross-sectional view used for explaining why an end surface of the platen is cut obliquely.

Mispositioning between the leading edge of the original document and the position at which the exposure is commenced or terminated can be prevented by providing a sloped end surface 2b of the platen 2 as shown in FIG. 4. That is to say, if the end surface 2b of the platen is vertical, the light B may not reach the leading edge A' of the original document as illustrated in FIG. 5. To prevent this, the end surface 2b of the platen may be cut obliquely. In the case of a sloped end surface 2a, the guide 9 is disposed parallel to the end surface 2b of the platen and both of the end surfaces 7c and 7d of the registration member 7 are made to be parallel to the guide 9 and the end surface 2b of the platen.

With the feeding device of the present invention constructed as described above, only a registration member 7 and an electromagnet 11 are required to be provided so that the construction is simpler, the number of parts is much reduced, and the device can be installed utilizing a narrower space effectively compared with the prior art construction.

Furthermore, since the registration member 7 is moved utilizing the repulsive force of a magnet, the registration member 7 can be moved uniformly over the longitudinal extend thereof and the registration member 7 can be moved downward uniformly from the running surface 2a of the original document with only a relatively small force so that the original document A will not be damaged when it is delivered.

What is claimed is:

1. A registration device for an automatic feeding device for original documents comprising: an elongated registration member disposed adjacent one edge of a platen member for supporting an original document in a copying position, a leading edge of said original document abutting an upper portion of said registration member in said copying position, said registration member comprising a permanent magnet extending substantially the length thereof; guide means disposed along at least one edge of said registration member wherein said registration member is movable between an upper position with said upper portion extending above the upper edge of said platen and a lower position below said upper surface of said platen; spring means for biasing said registration member toward said upper position; cover means disposed above said platen and registration member; and electromagnet means, said electromagnet means extending substantially the length of said registration member, said electromagnet means producing a magnetic field in response to an exciting signal applied thereto for urging said registration member to move to a position below said upper surface of said platen.

2. The registration device of claim 1 wherein said end of said platen is slanted and wherein said registration member and said guide means are slanted to conform with the slant of said edge of said platen.

3. The registration device of claim 1 wherein said exciting signal is indicative of the delivery of an original document.

4. The registration device of claim 1 wherein the magnetic field produced by said electromagnet means is uniform in the longitudinal direction of said electromagnet means.

*5. A registration device for an automatic feeding device for original documents comprising: a registration member disposed adjacent one edge of a platen member for registering an original document in a copying position with an edge of an original document abutting an upper portion of said registration member, wherein said registration member is movable between an upper position with said upper portion extending above the upper surface of said platen and a lower position not extending above said upper surface of said platen; biasing means for biasing said registration member toward said upper position; cover means disposable above said platen and said registration member; and magnetic means in said cover means for urging said registration member into said lower position.*

*6. The registration device of claim 5 wherein said magnetic means is an electromagnet producing a repulsive force on said registration member in response to an exciting signal applied thereto for overcoming said biasing means and moving said registration member below said upper surface of said platen.*

*7. The registration device of claim 5 wherein said cover means disposed within automatic original document feeding apparatus and the lowering of said registration member by said magnetic means is coordinated with delivery of an original document.*

*8. The registration device of claim 6 wherein said cover means disposed within automatic original document feeding apparatus and the lowering of said registration member by said magnetic means is coordinated with delivery of an original document.*

*9. The registration device of claim 5 further comprising guide means disposed along at least one edge of said registration member and containing movement of said registration member.*

*10. The registration device of claim 9 wherein one edge of said platen is slanted and said registration means and said guide means are also slanted to conform with the slant of the edge of said platen.*

*11. The registration device of claim 9 wherein said biasing means comprises a spring.*

*12. A registration device for an automatic feeding device for original documents comprising: a registration member disposed adjacent one edge of a platen member for registering an original document in a copying position with an edge of an original document abutting an upper portion of said*

*registration member, wherein said registration member is movable between an upper position with said upper portion extending above the upper surface of said platen and a lower position not extending above said upper surface of said platen; biasing means for biasing said registration member toward said upper position; cover means disposable above said platen and said registration member; and means carried by said cover means for urging said registration member into said lower position.*

*13. A registration device for an automatic feeding device for original documents comprising: a registration member disposed adjacent one edge of a platen member for registering an original document in a copying position with an edge of an original document abutting an upper portion of said registration member, wherein said registration member is movable between an upper position with said upper portion extending above the upper surface of said platen and a lower position not extending above said upper surface of said platen; biasing means for biasing said registration member toward said upper position; cover means disposable above said platen and said registration member; and means in said cover means not contacting said registration member for urging said registration member into said lower position.*

*14. A registration device for an automatic feeding device for original documents comprising: a registration member disposed adjacent one edge of a platen member for registering an original document in a copying position with an edge of an original document abutting an upper portion of said registration member, wherein said registration member is movable between an upper position with said upper portion extending above the upper surface of said platen and a lower position not extending above said upper surface of said platen; biasing means for biasing said registration member toward said upper position; cover means disposable above said platen and said registration member; and electronic means in said cover means actuated by an external force for urging said registration member into said lower position.*

* * * * *